United States Patent [19]

Windecker

[11] 4,051,296

[45] Sept. 27, 1977

[54] SILICONE RUBBER MOLD

[75] Inventor: Leo J. Windecker, Midland, Tex.

[73] Assignee: International Harvester Company, Chicago, Ill.

[21] Appl. No.: 777,378

[22] Filed: Mar. 14, 1977

[51] Int. Cl.$^2$ .............................................. B32B 3/26
[52] U.S. Cl. .................... 428/311; 156/246; 156/280; 264/225; 264/321; 428/315; 428/447
[58] Field of Search ............... 264/321, 225; 428/310, 428/315, 311, 447, 448; 156/246, 249, 280, 245

[56] References Cited

U.S. PATENT DOCUMENTS

| | | | |
|---|---|---|---|
| 3,880,686 | 4/1975 | Robinson | 156/245 |
| 3,930,919 | 1/1976 | Chant et al. | 428/315 |
| 3,944,704 | 3/1976 | Dirks | 264/321 |

*Primary Examiner*—William J. Van Balen
*Attorney, Agent, or Firm*—John P. O'Brien; Floyd B. Harman

[57] ABSTRACT

A reinforced silicone rubber mold composite is formed by bonding a silicone mold member to a rigid laminated member. The silicone rubber mold member is cast to conform to a desired pattern and its back surface is bonded to a flexible open-celled foam by means of a layer of the silicone rubber being impregnated into a layer of open cells of the foam which are adjacent to the back surface of the silicone rubber mold member. The laminated member consists of the flexible open-celled foam having the layer of open cells impregnated by the silicone rubber and the remaining open cells impregnated by a cured epoxy resin.

8 Claims, No Drawings

SILICONE RUBBER MOLD

BACKGROUND OF THE INVENTION

Certain room temperature vulcanizing (R.T.V.) silicone rubbers are excellent mold making materials for the purpose of providing precise surface detail of an existing part or prototype. In addition to their excellent reproduction characteristics, R.T.V. silicones exhibit low shrinkage in a range from 0 to 0.006 inches per inch and elongation ranging from 100 to 1000 percent.

One of the major disadvantages of silicone rubber molds is their tendency to distort. This problem is overcome in the prior art by casting the silicone rubber in an enclosure especially fabricated to permit the silicone rubber to have a considerable thickness. This thickness may range from one inch to six inches depending on the size of the part. There is a limit however as to the thickness that a silicone rubber mold can be made because they become self-deforming due to their own weight.

Another disadvantage of R.T.V. silicone rubber mold is the high cost of the materials. One of the objects of this invention is to provide a mold material that has the advantages of a silicone rubber mold but is less expensive to make.

Another object of this invention is to provide a mold material that has more rigidity than a conventional silicone rubber mode.

A further object of this invention is to provide a mold material that is easier to handle than conventional silicone rubber molds.

SUMMARY OF THE INVENTION

A reinforced silicone rubber mold made in accordance with the principles of this invention comprises a silicone rubber mold member having a mold surface conforming to the exact surface details of a desired pattern and a rigid laminated member. The rigid laminated member comprises a flexible open-celled foam having one surface bonded to the back surface of the silicone rubber mold member by a layer of silicone rubber impregnated into the layer of open cells of the foam that are adjacent to the silicone rubber mold member, and the remainder of the open cells in the flexible foam are impregnated with a cured resin.

DESCRIPTION OF THE PREFERRED EMBODIMENT

This invention is particularly suitable for making a mold in which the exact reproduction of both surface details and contour are important. The first step in practicing the method of this invention is to apply a layer of silicone resin across the surface to be reproduced. The silicone resin is composed of a mixture of R.T.V. silicone rubber and a curing agent therefor.

An additional portion of the mixed R.T.V. silicone rubber solution is impregnated into the bottom surface of a flexible open-celled foam that has been cut to the shape of the surface to be reproduced. The thickness of this R.T.V. rubber solution layer is small in comparison to the overall thickness of the flexible foam.

The sheet of flexible foam is then lightly pressed onto the wet R.T.V. silicone rubber solution in the mold area with its coated R.T.V. silicone rubber surface side down.

When the R.T.V. silicone rubber cures a mechanical bond is formed between the upper temperature surface and the flexible foam strip. After the R.T.V. silicone rubber has cured this invention employs the teachings of my prior U.S. Pat. No. 3,269,887 to rigidify the remaining unfilled open cells of the flexible foam with a settable resin solution containing a curing agent.

Because silicone rubbers do not bond well to other materials, the flexible foam serves the important function of providing a mechanical link between the silicone rubber and the resin backing.

The flexible foam may be any of the commercially available material such as flexible polyurethane, sponge rubber, the cellulose foams, etc. The foam must be of the type having a large number of open cells to facilitate impregnation with the silicone rubber and the settable resin. The particular method used to impregnate either solution into the foam is not critical. One simple but effective method of applying the silicone rubber to a layer of the flexible foam is to spread a layer of the silicone rubber solution on a surface area larger than the cross sectional area of the foam and then to simply press the bottom surface of the foam onto this silicone rubber solution. After the silicone rubber has cured, the settable resin may then be added by simply working the settable resin into the top surface of the foam until the entire proportion of the foam is saturated.

Because room temperature vulcanizing silicone rubbers are excellent mold making materials for obtaining the precise surface details of a desired pattern, it is preferable to use a R.T.V. type silicone rubber. The formulation for such a R.T.V. silicone rubber consists of ten parts of SILASTIC® G R.T.V. mold making rubber with one part of a curing agent as prescribed by the commercially available Dow Corning SILASTIC® rubber. It will be understood however that other commercially available silicone rubber formulations of various viscosities could be used as well in practicing this invention.

Because epoxy resins are effective hardening agents they would be quite suitable for rigidifying the foam. A suitable epoxy resin formulation could consist of 100 parts of D.E.R.® 331 resin mixed with D.E.H. 14® curing agent, which are made by the Dow Chemical Corporation.

Greater strength to the silicone rubber mold composite may be achieved by adding fiber glass cloth to the outer surface of the flexible foam containing the settable resin prior to curing or after curing.

By following the method of this invention it is possible to make large silicone rubber molds that are impossible with prior art methods due to the self-distortion characteristic of silicone rubber mold. For example, it is now possible to construct a reinforced silicone rubber mold as described above for casting a thermo-set optical quality resin to produce a transparent optical structure such as a windshield.

What is claimed is:

1. A reinforced silicone rubber mold comprising a silicone rubber mold member having a mold surface conforming to the desired pattern and a rigid laminated member, said laminated member including a flexible open-celled foam having one surface bonded to the back surface of said silicone rubber mold member by a layer of silicone rubber impregnated into the layer of open cells of said foam that are adjacent to said one surface, and a layer of cured resin impregnated into the remainder of said open cells of said flexible foam.

2. A reinforced silicone rubber mold as defined in claim 1, further comprising a fiber-reinforced material bonded to the side of said foam opposite to said mold surface.

3. A reinforced silicone rubber mold as defined in claim 1, wherein said flexible open-celled foam is polyurethane foam.

4. Method of producing a reinforced silicone rubber mold comprising:
   applying a layer of a settable silicone rubber and a curing agent therefor across a surface area having a desired pattern;
   impregnating the bottom surface of an open-celled flexible foam with a small amount of settable silicone rubber and a curing agent to form a layer extending across said bottom surface;
   placing said flexible foam onto said surface area in a manner to urge said bottom surface into contact with said layer of settable silicone rubber and curing agent;
   effecting the cure of said silicone rubber layers;
   impregnating the remaining portion of said flexible form with a settable resin and a curing agent therefor, and
   effecting the cure of said resin.

5. The method according to claim 4, wherein said open-celled flexible foam is polyurethane.

6. The method according to claim 4, wherein said settable silicone rubber has room temperture vulcanizing characteristics.

7. The method according to claim 4, wherein said settable resin is an epoxy resin.

8. The method according to claim 4, further comprising the step of adding a strip of fiber reinforced material to the top surface of said flexible foam prior to the curing step of said resin.

* * * * *